United States Patent Office 3,706,721
Patented Dec. 19, 1972

---

3,706,721
CONTROL OF MOLECULAR WEIGHT IN THE PRODUCTION OF ALFIN POLYMERS
Lowell D. Grinninger, Cincinnati, Ohio, assignor to National Distillers and Chemical Corporation, New York, N.Y.
No Drawing. Filed Mar. 26, 1970, Ser. No. 23,057
Int. Cl. C08d 1/32, 3/06
U.S. Cl. 260—82.1                                  17 Claims

ABSTRACT OF THE DISCLOSURE

A process is provided for the control of molecular weight in the production of alfin polymers and copolymers by effecting the polymerization of the monomers by an alfin catalyst in the presence of a specific type of triene hydrocarbon compound having a conjugated diene structure adjacent to an allyl group. The molecular weight of an alfin polymer can be controlled by adjustment of the proportion of this molecular weight control agent or moderator.

---

Morton and coworkers in a series of papers in the Journal of the American Chemical Society, starting in 1947, describe an organo alkali metal catalyst for the polymerization of certain olefins, and particularly 1,3-dienes, which they term an "alfin" catalyst, J. Am. Chem. Soc., 69, 161; 167; 950; 1675; 2224 (1947). The name "alfin" is taken from the use of an alcohol and an olefin in their preparation. The alcohol, a methyl n-alkyl carbinol, usually isopropanol, in the form of the sodium salt, the olefin, also in the form of the sodium salt, and an alkali metal halide, form a heterogeneous complex that constitutes the catalyst.

These catalysts are reported by Morton et al. to cause the polymerization of 1,3-butadiene, isoprene and other 1,3-dienes, alone and/or together with other copolymerizable organic compounds, in most cases olefinic in nature. Monoolefinic hydrocarbons alone do not appear to react, but will copolymerize with dienes when the olefinic group is attached to an aromatic nucleus, an example being styrene. The catalyst was discovered in the course of a study of the addition of organosodium compounds to dienes. Later on, Morton summarized the work done up until 1950 in Industrial and Engineering Chemistry, 42, 1488–1496 (1950).

The elastomeric polymers obtained from 1,3-dienes alone or copolymerized with certain olefins using alfin catalysts are termed alfin polymers or alfin rubbers. Because of the speed and ease of this reaction, these rubbers attracted considerable interest in the 1940's and early 1950's. However, the very speed of the reaction led to problems. The alfin rubbers when produced in accordance with the process described by Morton and coworkers had the disadvantage of an extremely high molecular weight, generally in excess of 3,000,000, and frequently in excess of 10,000,000. As a result, although these polymers are generally gel-free and have high tensile strength, superior abrasion resistance and tear strength, and are also very tough and exhibit little breakdown, they consequently give poor banding on the mill and are difficult to process. They are difficult, if not impossible, to process using conventional rubber handling equipment. Consequently, interest and research in alfin catalysis was minimal until rather recently and in their original form, these alfin rubbers have found no commercial application whatsoever.

The difficulty of processing alfin rubbers led to the suggestion by Pfau et al., U.S. Pats. Nos. 2,964,083, granted Dec. 13, 1960, and 3,074,902, granted Jan. 22, 1963, that the working viscosity of the alfin polymers be reduced by incorporation of liquid plasticizers, particularly petroleum hydrocarbon oil. However, these procedures are difficult to follow and have not received commercial application.

Interest in alfin rubbers was renewed when Greenberg et al. in U.S. Pats. Nos. 3,067,187 and 3,223,691 showed that it was possible to produce alfin rubbers of relatively low and medium molecular weights, ranging from about 50,000 to about 1,250,000 using molecular weight moderators or control agents. Greenberg and Hansley describe their work in Rubber Age, vol. 94, No. 1, October 1963, pp. 87 to 92. The molecular weight moderators proposed were certain dihydro derivatives of aromatic hydrocarbons, such as 1,4-dihydrobenzene and 1,4-dihydronaphthalene. Somewhat less effective were the 1,2-dihydro cyclic derivatives. By adjustment of the proportion of molecular weight moderator or control agent and the other conditions of the reaction, such as temperature, pressure and the quantity and type of diluents employed, Greenberg and Hansley showed that it was possible to obtain alfin rubbers over a wide range of low and medium molecular weights.

Grinninger et al. U.S. Pat. No. 3,423,379 showed that allyl benzene and naphthalene compounds also acted as molecular weight moderators or control agents. These have an allyl group attached to an aromatic benzene or naphthalene nucleus.

In accordance with the instant invention, it has now been discovered that triene hydrocarbon compounds having an allyl group adjacent to a conjugated diene group are effective molecular weight control agents or moderators for alfin polymerizations. These compounds are of the type I

wherein R represents the conjugated diene system and can, for example, be an aliphatic conjugated diene hydrocarbon group, or a 1,3-dienically unsaturated cycloaliphatic ring, or a 1,3-dienically unsaturated group attached to an aromatic ring or ethylenically unsaturated ring in a conjugated diene system.

Accordingly, these 1,3,6-triene hydrocarbons have the general formula:

II
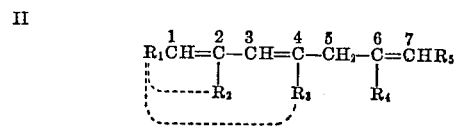

R in Formula I represents

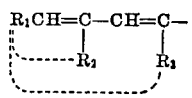

in Formula II.

In Formula II, $R_1$, $R_2$, $R_3$, $R_4$ and $R_5$ can be hydrogen or an organic hydrocarbon or oxyhydrocarbon radical having from one to about ten carbon atoms, and no more than four and preferably no more than two of the R groups is a hydrocarbon or oxyhydrocarbon radical. $R_1$ and $R_2$ or $R_1$ and $R_3$ or $R_1$, $R_2$ and $R_3$ can be taken together to form a mono- or binuclear carbocyclic ring, which can be either dienically or ethylenically unsaturated, with the unsaturated groups linked in the relative position indicated, so as to encompass a conjugated diene+allyl structure, either wholly within one or adjacent rings; or partially within one or adjacent rings, and partially in a side chain attached to the ring; or wholly in an aliphatic chain; so that the three unsaturated carbon-to-carbon ethylenic double bonds are in the conjugated diene+allyl positions.

The $R_1$, $R_2$, $R_3$, $R_4$ and $R_5$ groups can be hydrogen or organic hydrocarbon groups which can be saturated or unsaturated aliphatic radicals, in which case the 1,3-triene is an open chain compound.

Typical alkyl radicals are methyl, ethyl, propyl, isopropyl, butyl, isobutyl, secondary butyl, tertiary butyl, amyl, isoamyl, hexyl, heptyl, isoheptyl, octyl, isooctyl, 2-ethylhexyl, nonyl and decyl.

Typical alkenyl radicals include allyl, vinyl, butenyl, butadienyl, hexadienyl, hexenyl, heptenyl, octenyl, nonenyl and decenyl.

Typical alkoxy radicals include methoxy, ethoxy, propoxy, butoxy, isobutoxy, amyloxy, hexoxy, heptoxy, nonoxy and decoxy. Alkenoxy radicals include ethenyloxy, allyloxy, butadienyloxy, and hexenyloxy.

When $R_1$ and $R_2$ and $R_3$ or $R_1$, $R_2$ and $R_3$ are taken together to form a cycloaliphatic ring, the ring will be a monocyclic conjugated diene+allyl positions.

The $R_1$, $R_2$, $R_3$, $R_4$ and $R_5$ organic hydrocarbon groups can be saturated or unsaturated aliphatic radicals, in which case the triene is an open chain compound.

Typical alkyl radicals are methyl, ethyl, propyl, isopropyl, butyl, isobutyl, secondary butyl, tertiaryl butyl, amyl, isoamyl, hexyl, heptyl, isoheptyl, octyl, isooctyl, 2-ethylhexyl, nonyl and decyl.

Typical alkenyl radicals include allyl, vinyl, buteryl, butadienyl, hexadienyl, hexenyl, heptenyl, attenyl, nonenyl and decenyl.

Typical alkoxy radicals include methoxy, ethoxy, propoxy, butoxy, isobutoxy, amyloxy, hexoxy, heptoxy, nonoxy and decoxy. Alkenoxy radicals include ethenyloxy, allyloxy, butadienyloxy, and hexanyl.

When $R_1$ and $R_2$ or $R_1$ and $R_3$, or $R_1$, $R_2$ and $R_3$ are taken together to form a cycloaliphatic ring, the ring will be a monocyclic cycloaliphatic nucleus, such as a cyclopentane or cyclohexane ring, or a condensed polycycloaliphatic nucleus, such as a bicyclic terpene nucleus. If only $R_1$ and $R_2$ are taken together to form a ring, then one ethylene group of the diene and the allyl group are present in a side chain attached to one of the ring carbon atoms of the carbon-to-carbon ring double bond. If $R_1$ and $R_3$ are taken together, the conjugated diene group is in the ring, and the allyl group in a side chain attached to one of the diene end carbons. If $R_1$, $R_3$ are taken together, the conjugated diene+allyl can also be wholly within the ring, as in 1,3,6-cyclo-octatriene. Exemplary rings are cyclobutene, cycloaliphatic nucleus, such as a cyclopentane or cyclohexane ring, or a condensed polycycloaliphatic nucleus, such as a bicyclic terpene nucleus. If only $R_1$ and $R_2$ are taken together to form a ring, then one ethylene group of the diene and the allyl group are present in a side chain attached to one of the ring carbon atoms of the carbon-to-carbon ring double bond. If $R_1$ and $R_3$ are taken together, the conjugated diene group is in the ring, and the allyl group in a side chain attached to one of the diene end carbons. If $R_1$, $R_3$ are taken together, the conjugated diene+allyl structure can also be wholly within the ring, as in 1,3,6-cyclooctatriene. The ring may have from three to eight ring carbon atoms, and an ethylenic or dienic structure. Exemplary rings are cyclobutene, cyclopentene, cyclopentadiene, cyclohexene, cyclo-1,3-hexadiene, cycloheptene, cyclo-1,3-heptadiene, cyclooctene and cyclo-1,3-octadiene.

$R_1$, $R_2$, $R_3$, $R_4$ and $R_5$ can also be a cycloalkyl or cycloalkenyl group, such as cyclobutyl, cyclopenyl, cyclohexyl, cycloheptyl, cyclooctyl, cyclobutenyl, cyclopentenyl, cyclohexenyl, cycloheptenyl and cyclooctenyl, or a cyclodienyl group, such as cyclobutadienyl, cyclopentadienyl, cyclohexadienyl, cycloheptadienyl, and cyclooctadienyl.

$R_1$, $R_2$, $R_3$, $R_4$ and $R_5$ can also be an aromatic group, such as phenyl, naphthyl or phenanthryl, or a mixed aromatic aliphatic group, such as benzyl or phenethyl.

$R_1$, $R_2$, $R_3$, $R_4$ and $R_5$ can also be cycloalkoxy, such as cyclobutyloxy, cyclohexyloxy, and cyclopentyloxy, or phenoxy, or alkylphenyloxy, such as benzyloxy, phenethyloxy, and methylphenyloxy, and naphthyloxy.

The presence of bulky substituents on the carbon atoms of the conjugated diene group apparently reduce activity. Consequently, in the preferred compounds, either $R_1$, $R_2$ and/or $R_3$ are taken together to form a ring, or else they are all hydrogen and, in any case, if they are alkyl or alkenyl substituents they should have less than five carbon atoms. However, in some reactions, compounds having a low molecular weight moderating activity are more desirable than compounds having a high activity, because molecular weight can be controlled with less precise control of reagent addition, and because their effect in molecular weight moderators may also be felt during the latter stages of the polymerization reaction, thus permitting the obtention of polymers of rather high, but uniformly controlled, molecular weight, as a function of reaction time.

The aliphatic open chain triene compounds are preferred. Exemplary of 1,3,6-triene compounds falling within the above classes are 1,3,6-heptatriene,
1,3,6-octatriene,
2,6-dimethyl-1,3,6-heptatriene,
2,4,6-trimethyl-1,3,6-heptatriene,
2-phenyl-1,3,6-octatriene,
5-methyl-1,3,6-heptatriene,
5-ethyl-1,3,6-heptatriene,
3-methyl-1,3,6-octatriene,
5-methyl-1,3,6-octatriene,
2,4,7-decatriene,
2-methyl-1,3,6-nonatriene,
5-methoxy-1,3,6-heptatriene,
2-methyl-1,3,6-heptatriene,
6-methyl-1,3,6-heptatriene,
2-ethyl-1,3,6-heptatriene,
4-methyl-1,3,6-heptatriene,
2,4,7-nonatriene,
1,3,6-decatriene,
3,5,8-dodecatriene,
2-cyclohexyl-1,3,6-heptatriene,
4-phenyl-1,3,6-octatriene,
1,3,6-cyclooctatriene,
1-allyl-1,3,6-cyclohexadiene,
1-allyl-1,3-cycloheptadiene and the like.

The reason why the molecular weight control agents of the instant invention are effective is not understood. There appears to be no similarity between the compounds of the present invention and the molecular weight moderators of the Greenberg et al. Pat. No. 3,067,187, the compounds of this invention being characterized by the presence of an allyl group and a conjugated diene group which are not present in the Greenberg et al. compounds. It is believed that in the compounds of the invention, the allyl group may be significant in controlling molecular weight, and that it cooperates with the conjugated diene portion of the molecule in the same way. The system includes a 1,4-diene system, and this appears very likely to be the essential activating group for molecular weight control.

That it is not the conjugated diene portion alone of the molecule that is responsible for molecular weight control is apparent from the fact that conjugated diene compounds of the open chain type are not effective molecular weight control agents but are indeed monomers, whereas the open chain 1,3,6-trienes are active controlling species. Thus, the presence of the allyl substituent in conjunction with the conjugated system is necessary in these trienes to obtain molecular weight control activity and this being so, the allyl group must play a part. However, the manner in which the allyl group actually functions has not been elucidated, unless it is as a part of the 1,4-diene system. All that is known is that the addition of the allyl group to a conjugated diene group imparts molecular weight controlling activity.

In the process for preparing alfin polymers in accordance with the present invention, monomers, alfin catalyst, 1,3,6-triene molecular weight control agent and solvent are mixed and polymerization of the monomer then effected at a ambient temperature by the alfin catalyst in the presence of the triene molecular weight control agent. Unreacted monomer, control agent and solvent can then be separated from the reaction mixture by precipitation with a non-solvent, or by distilling the solvent before or after quenching the reaction mixture with water and washing and drying the alfin polymer. Solvent, along with unreacted moderator and monomer, can, if desired, be recovered and recycled for reuse.

The process of the invention is particularly adapted for a continuous operation in which the monomers, alfin catalyst, triene molecular weight control agent and solvent are continuously blended, the polymerization continuously effected and the volatile materials continuously separated either before or after quenching the reaction mixture with water, after which the volatile materials can be steam-distilled from the resulting rubber latex dispersion. The solvent moderator and monomers can then be recovered and recycled after purification while the alfin polymer crumb is washed and dried, for example, by means of an expeller-expander operation, at which point antioxidant can also be added.

In the process of the invention, the molecular weight of the polymer can be controlled by adjustment of the proportions of molecular weight control agent and in a continuous process this would very likely be the variable adjusted, other conditions being fixed. However, reaction temperature and time, proportions of catalyst, and other process variables can also affect molecular weight to a certain extent, and can be adjusted as required. A catalyst deactivator is used if desired, but is unnecessary, particularly if the reaction mixture is quenched with water in the crumb forming step since this destroys the catalyst.

The alfin catalyst can be prepared by known procedures. Typical preparations of an alfin catalyst have been described in sufficient detail in the Greenberg et al. Pats. Nos. 3,067,187 and 3,223,691 and in Hoffman et al. Pat. No. 3,317,437, and in the Morton articles supra, so that full details are not required here, and those skilled in the art will know from the following description how to utilize sodium dispersions in accordance with the inventive preparations.

A particularly effective alfin catalyst is obtained when the sodium is employed as a finely-divided dispersion in an inert diluent, in which the maximum sodium average particle size is about 1 to 10 microns. The amount of sodium in the dispersion is not critical and can be adjusted to suit any alfin catalyst preparatory procedure. A sodium concentration within the range from about 2 to about 50% can be used, although a 25% weight concentration is generally used.

The inert diluent can be any liquid aliphatic or cycloaliphatic hydrocarbon. The hydrocarbon should be a liquid under the conditions during which the sodium dispersion and alfin catalyst are formed and is preferably the same as that used in the polymerization of the monomer by alfin catalyst, making a one solvent system possible.

Satisfactory aliphatic hydrocarbon solvents that can be used in alfin catalyst preparation and also in alfin polymer formation include pentane, hexane, heptane, octane, nonane and decane, 2-methylpropane, 2-methylbutane, 2,3-dimethylbutane, 2-methylpentane, 3-methylpentane, 2,2-dimethylpentane; 2,3-dimethylpentane; 2,4-dimethylpentane; 2,2,4-trimethylpentane; 2-methylhexane; 3-methylhexane; 2,4-dimethylhexane; 2,5-dimethylhexane; 2,2,4-trimethylhexane; 2,3,4-trimethylhexane; 3,3,4-trimethylhexane; 2-methylheptane; 3-methylheptane; 2,3-dimethyloctane; 2-methylnonane; 3,4-dimethylnonane; 3-methyldecane; 2-methylundecane; 2-methyldodecane; 2,2,4-trimethyldodecane, etc., and mixtures thereof. While the above examples have been listed with respect to the mono-, di-, and tri-methyl substituted aliphatic hydrocarbons, it should be appreciated that other lower alkyl-substituted hydrocarbons are considered applicable. Other suitable alkyl radicals include ethyl, isopropyl, butyl, etc. Olefinic hydrocarbon compounds such as propylene, butene-1, butene-2, isobutylene, etc. and mixtures thereof with each other or any of the above listed chemical compounds or mixtures can also be used. Solvents having active hydrogens such as vinyl acetylene, cyclopentadiene, etc. destroy alfin catalyst and cannot be used. Especially suitable, since they are readily obtainable are commercial mixtures of branched aliphatic hydrocarbons, such as "Isopar C," which has the composition:

| Component | Method | Volume percent |
|---|---|---|
| Aromatics | U.V. analysis | <0.004 |
| Do | ASTM D 875 | 0.3 |

| Gas chromatography analysis: | Wt. percent |
|---|---|
| 2,3-dimethylbutane | 0.3 |
| 2-methylpentane | 0.1 |
| 3-methylpentane | 0.1 |
| 2,4-dimethylpentane | 3.0 |
| 2,2,3-trimethylbutane | 0.6 |
| 2-methylhexane | 0.4 |
| 2,3-dimethylpentane | 2.8 |
| 3-methylhexane | 0.8 |
| 2,2,4-trimethylpentane | 87.3 |
| 2,5-dimethylhexane | 1.7 |
| 2,4-dimethylhexane | 2.1 |
| 2,2,3-trimethylpentane | 0.0 |
| 2,3,4-trimethylpentane | 0.6 |
| 2,3,3-trimethylpentane | <0.2 |

"Isopar E," a material devoid of normal hydrocarbons, which typically has the composition:

| Component: | Weight percent |
|---|---|
| 2,2,4-trimethylpentane | 2.2 |
| 2,5-dimethylhexane | 4.8 |
| 2,4-trimethylhexane | |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane | |
| 3,4-dimethylheptane | 5.7 |
| 2,3-dimethylheptane | |
| 3,3,4-trimethylhexane | |
| 15 other iso-components | 13.7 |
| $C_9$ naphtha+$C_{10+}$ | 1.8 |
| | 100.0 | the $C_6$ hydrocarbon mixture having the following composition:

| Component | Weight percent | Range percent |
|---|---|---|
| 2-methylpentane | 16.2 | 8-33 |
| 3-methylpentane | 15.3 | 14-19 |
| n-Hexane | 49.1 | 38-61 |
| Methylcyclopentane | 17.1 | 5-18 |
| Cyclohexane | 1.4 | 0.2-2 |
| Benzene | 0.1 | <1% |
| Unknown (including propane, butanes, pentanes and toluene) | 0.2 | <1% |
| Total | 100.0 | 100.0 | and light alkylates which are devoid of n-hydrocarbons, such as Sinclair's "Light Alkylate," which has the following composition:

| Component: | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 |

Also useful are cycloalphatic hydrocarbons, such as cyclohexane, cyclopentane, methyl cyclohexane, and cycloheptane.

As the secondary alcohol component, to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as —20° C. being satisfactory. There is no upper limit on this reaction temperature under certain conditions. Usually a 20° C. maximum temperature is used. Consequently, the reaction temperature used is that suitable for metallation of an olefin. An alkyl halide, generally butyl chloride is reacted with the remaining sodium dispersion to give butylsodium which is then transmetallated.

The olefin used for transmetallation can have from about three to about ten carbon atoms and should contain the group $CH_2=CHCH_2-$. Propylene is preferred, giving allylsodium, but butene-1, butene-2, pentene-1 and hexene-1 can also be used. Activity may decrease as the olefin molecular weight increases.

The alkenyl sodium, sodium halide and sodium alkoxide composing the alfin catalyst are prepared by reaction of the sodium slurry with the alcohol and the olefin in the presence of the dispersing liquid used for the catalyst. This can be and preferably is the same as the inert diluent used for the sodium dispersion. Frequently, however, if a solvent fractionation step is not inconvenient, a lower-boiling hydrocarbon such as hexane is used to facilitate separation later. Any inert aliphatic or cycloaliphatic hydrocarbon is satisfactory.

The olefin is metallated by use of an alkyl sodium which is prepared in situ from an alkyl halide having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about —20° to about 130° C. can be employed. From one-half to about five hours' reaction time is normally adequate.

The reaction mixture can be prepared by mixing the catalyst diluent, sodium dispersion and alkyl halide and then adding the alcohol. After the alkoxide has been formed, the olefin is added, and metallated. Excess olefin may be removed by venting and the residue can be used as the alfin catalyst, without further treatment or purification. In this method, the sodium is first converted to the alkyl sodium, and half of this is then converted to the alkoxide and the remainder is converted to alkenyl sodium, usually allylsodium.

It is also possible to add the alcohol to the sodium dispersion mixed with the catalyst diluent, forming the sodium alkoxide and then adding the alkyl halide and finally, the olefin. This procedure requires half the amount of alkyl halide, and three-quarters the amount of sodium required by the first procedure, and is therefore preferred for use in a commercial operation.

The process of the invention can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha-methyl-styrene, vinyl naphthalene, and other unsaturated hydrocarbons. 1,3-butadiene alone and combinations of 1,3-butadiene and styrene and of butadiene and isoprene are preferred polymerizable unsaturated comonomer compounds.

The amount of molecular weight control agent, the 1,3,6-triene hydrocarbon compound, is selected according to the molecular weight desired. The amount required for a given molecular weight is dependent upon such factors as the temperature and pressure of the reaction and the quantity and type of diluents employed, but if these variables be held constant, the amount of the molecular weight control agent will regulate the molecular weight of the polymer.

In general, the amount of molecular weight control agent may vary from about 0.1 to about 10%, based on the weight of the monomer, and in the case of the 1,3,6-trienes, from about 0.4 to about 1% by weight is preferred.

The moderators of the invention do not change the ratio of 1,4-trans to 1,2-vinyl geometric isomeric structures in the resulting polymers, a ratio in the range of 2 to 3 obtained in most cases, usually about 2.5.

Before employing a monomer in accordance with the invention, it is essential that the monomer be prepared for the alfin polymerization by removing any water, acetylene or other hydrolytic agents that may be present and usually at least part if not all of any polymerization inhibitor, particularly any phenols, such as in a distillation dryer. If the drying tower is operated at 75 p.s.i.g., cooling water may be used for condensation of both the monomers and the water. The water can then be separated from the hydroarbon monomer layer, which is recycled to the column. The almost dry monomers can be withdrawn from the dryer as a vapor and condensed again. The monomers are now essentially dry and contain 20 p.p.m. of water or less, together with a few p.p.m. of the inhibitor, tertiary butyl catechol, for example. The monomer can then be withdrawn, leaving behind the inhibitor which is essentially nonvolatile relative to the monomer and is ready for feeding back into the polymerization reactor system.

The polymerization is effected in the presence of a hydrocarbon diluent or solvent for the monomer and the alfin rubber. Preferred reaction media are inert aliphatic and cycloaliphatic hydrocarbons, such as pentane, hexane, a 1:1 mixture of hexane and pentane, octane, cyclohexane, cyclopentane, cycloheptane, Decalin, and heptane. The preferred reaction solvent is the same hydrocarbon employed for the dispersion of sodium in the preparation of the alfin catalysts, aliphatic branched chain solvents such as Isopar C, Isopar E, isooctane or commercial hexane. Branched chain hydrocarbon solvents tend to give polymers having a lower solution viscosity than straight chain hydrocarbon solvents and in many cases, consequently, branched chain hydrocarbon solvents are preferred.

The reaction is carried out at room or elevated temperatures. Below —20° C. polymerization is very slow. The batch-wise type of reaction described in the Greenberg et al. patent, which employs room temperature or below, can be used. Whereas in the batch process the reactants are usually mixed at a very low temperature, of the order of —10° C., all of the streams of reactants, including catalyst, molecular weight control agent and diluent or solvent are blended in a continuous operation of the invention at a temperature within the range from about 0 to about 70° C., so as to expedite a rapid attainment of the reaction temperature. It may be necessary to facilitate heat removal during the initial stages of the reaction.

A continuous polymerization reaction is carried out in a reaction zone with the blend of reactants continuously entering at one end and alfin polymer reaction mixture (cement) continuously being withdrawn at the other end. The rate of transit through the zone is timed to allow polymerization to proceed at least to 70 to 85% of completion at the moderator and catalyst level employed. This usually requires from about one to about four hours. The polymerization temperature is 0° C. or above, up to approximately 100° C. and preferably within the range from about 50 to about 80° C.

The reaction is exothermic and after the selected reaction temperature is reached, and reaction is proceeding, the reaction temperature should be controlled by removal of heat liberated in the course of the polymerization, preferably in the initial reactors. For this purpose, efficient cooling may be needed, with a large surface area exposed to the coolant. A batch reactor can be provided with an adequate coolant system, such as a jacket and/or cooling coils, through which a suitable coolant can be circulated, such as water.

For more effective control of reaction temperature and hence of the polymerization, in a continuous process, a series of reactors can be used. The reactors are operated liquid full and under pressure in order to ensure that the reaction is carried out in the liquid phase, in solution or dispersion in the solvent employed. Pressures of from about 1 to about 50 atmospheres are suitable and higher pressures, up to 300 atmospheres, can be used.

The concentration of reactants in the reaction mixture appears not to be critical. In a batch-wise reaction, a rather concentrated solution, ranging from 10 to 25% monomer is employed. On the other hand, in a continuous operation, the effluent from the polymerization reaction system should contain a maximum of 25 weight percent of alfin rubber solids and preferably from about 8 to about 12 weight percent alfin rubber solids at the chosen reaction temperature, before solvent removal. As little as 5 weight percent alfin rubber solids is satisfactory and even 2% can be handled, but of course as the cement becomes more dilute, the volumes of solvent being recycled become rather large for the weight of polymer being produced and solvent efficiency goes down. The olefin and/or diene monomer starting material concentration is adjusted accordingly and is at most 15 weight percent, preferably from about 10 to about 12 weight percent solids content.

The amount of active alfin catalyst (solids basis) after cleanup that is employed is normally from about 1 to about 5 weight percent, and preferably from about 1 to about 3.5 weight percent based on the weight of the unsaturated organic monomer compound employed.

As indicated previously, it is quite important that water as well as other hydrolytic agents be excluded from the alfin polymerization reaction mixture. Consequently it is essential that all components that are employed therein be as highly purified as possible.

A continuous polymerization reaction is carried out under such conditions that approximately 80 to 85% of the diene and/or aromatic olefin monomers is polymerized. It is not necessarily desirable to obtain a maximum polymerization of aromatic olefin and/or diene starting material, as is possible in a batch-wise operation. Control of molecular weight and hence of the Mooney viscosity of the polymer is effected by the amount of the 1,3,6-triene molecular weight control agent that is added. The polymerization product is obtained as a somewhat soluble suspension in the diluent used in the alfin rubber process and this mixture of alfin rubber is referred to as alfin rubber cement.

At the conclusion of the polymerization reaction, an antioxidant must be added, as a preservative for the alfin rubber during subsequent processing. A very small amount of the antioxidant is effective. An amount within the range from about 0.1 to about 5% by weight of the alfin polymer will suffice. As the antioxidant, there can be employed any organic phenol, organic amine, or aminophenol, such as, for example, 2,2'-methylene-bis(4-methyl-6-tertiary-butylphenol) or N-phenyl-2-naphthylamine.

The 1,3,6-triene molecular weight control agent (moderator) is used in an amount to give the desired molecular weight. It has been determined that after the desired molecular weight is reached in a continuous process, it is quite unnecessary to arrest the polymerization. The moderator gives sufficient protection. In fact, to add conventional quenching compounds such as ethanol for the purpose is undesirable, because this will contaminate the solvent system and since alcohol destroys the alfin catalyst it must be removed before the solvent can be recycled.

At the conclusion of the alfin polymerization reaction, the alfin polymer is recovered by stripping off volatile materials. These can be separated by flashing and/or by steam-stripping from an aqueous dispersion in which the reaction mixture is quenched, the water hydrolyzing the alfin catalyst, and unreacted monomer moderator and solvent being volatilized, together with any unreacted monomer and isopropyl alcohol released from the catalyst. The alfin polymer precipitates as a wet, finely-divided crumb, and becomes suspended in the water in this form. It is then separated from the resulting dispersion, washed, antioxidant added and dried, while the reusable volatile materials, such as monomer control agent, and solvent can be recovered and recycled, if desired.

The following examples in the opinion of the inventor represents preferred embodiments of the invention.

The alfin catalyst employed in these examples was prepared using the following procedure:

PROCEDURE A

Dry hexane, 660 g., was charged into a 3-necked flask provided with stirrer and a Dry Ice reflux condenser. To this was added 96.6 g. (1.2 g. atoms) of finely divided sodium dispersed in a hydrocarbon medium as a 28.6% dispersion. Then 24.0 g. (0.40 mole) was added to this dispersion over a period of 20 minutes and permitted to react for 25 minutes at ambient temperature without additional cooling. n-Butyl chloride 44.5 g. (0.42 mole) was now added over a period of 25 minutes. Stirring was maintained for an additional hour without cooling. Excess dry propylene (C.P. grade) was subsequently introduced into the mixture in at least 10% molar excess (0.44 mole) and maintained under reflux for at least 2 hours. The preparation was then permitted to degas (propylene and butane) at room temperature without stirring. The reaction slurry or catalyst was transferred to a storage vessel under an inert atmosphere and diluted with sufficient dry hexane to make 1120 g. (1600 ml.).

This slurry theoretically contains 0.4 mole of sodium isopropoxide, 0.4 mole of allylsodium and 0.4 mole of sodium chloride.

It is also possible to prepare an alfin catalyst for use in any of these examples according to the following procedure:

PROCEDURE B

Dry hexane, 660 g., was charged to a 3-necked flask provided with stirrer, inert gas sweep, a Dry Ice reflux condenser system and an external cooling bath. To this was added 132.4 g. (1.6 g. atoms) 27.8% finely divided sodium (2 microns maximum average particles size) dispersed in a hydrocarbon medium. The slurry was cooled to −10° C. and 102 g. (0.84 mole) of dry n-amyl chloride was added slowly with moderate stirring which was continued for one hour after the addition had been completed. Then 24.0 g. (0.40 mole) of isopropyl alcohol was added slowly with moderate stirring which was continued for one hour after the addition had been completed. Stirring was maintained for an additional 45 minutes.

Excess dry propylene (C.P. grade) was subsequently introduced into the mixture, the temperature of which was maintained at −10° C. until active reflux of the propylene occurred. The temperature was then raised gradually to 25° C. by venting propylene and the mixture was stirred at this temperature for six hours. The propylene was allowed to leave the system and collected for recycle. The reaction slurry was transferred to a storage vessel maintained under an inert atmosphere of nitrogen and was then diluted to 1120 g. (1600 ml.) with dry hexane. This slurry, that is, the alfin catalyst, should theoretically contain 0.4 mole of sodium isopropoxide, 0.4 mole of allyl sodium and 0.8 mole of sodium chloride.

EXAMPLE 1

Into a reaction vessel were placed 150 m. of hexane, 3.2 g. of 1,3,6-octatriene (prepared in accordance with the procedure of U.S. Pat. No. 3,284,529, dated Nov. 8, 1966, 99.5% pure), and 30.3 g. of butadiene. There was added small increments of alfin catalyst, prepared according to Procedure A above, in order to produce incipient polymerization (cleanup). Then 4 ml. of alfin catalyst was added and reaction continued for two hours at room temperature at which time the polymerization is essentially complete.

The reaction mixture was quenched by addition of a small amount of ethanol and the polymer precipitated with alcohol and rinsed with water in a Waring Blendor to obtain 18.4 g. of alfin polymer, representing a yield of 60.7%. The intrinsic viscosity of the polymer was 4.65. The molecular weight of the polymer was determined and found to be 724,400, showing effective molecular weight moderation in the presence of the 1,3,6-octatriene.

EXAMPLE 2

Into a reactor was placed 150 ml. of hexane, 4.8 g. of 1,3,6-octatriene and 30.1 g. of butadiene. Then, alfin catalyst prepared according to Procedure A above was added again in small increments to achieve incipient polymerization. Then, 4 ml. of the alfin catalyst was added, and the reaction mixture permitted to react at ambient temperature for two hours.

The reaction mixture was quenched by addition of a small amount of ethanol and the polymer precipitated and washed as in Example 1 to obtain 15.8 g. of alfin polymer, representing a yield of 52.5%. The intrinsic viscosity of the polymer was 4.37. The molecular weight of the polymer was determined and found to be 645,700, showing effective molecular weight moderation.

EXAMPLE 3

Into a reactor was placed 150 ml. of hexane, 1.6 g. of 1,3,6-octatriene and 30.9 g. of butadiene. Alfin catalyst was added, again in small increments for cleanup. Then, 4 ml. of working alfin catalyst was added and reaction permitted to continue for two hours at ambient temperature.

The reaction mixture was quenched by addition of a small amount of ethanol and the polymer precipitated and washed as in Example 1 to obtain 19.1 g. of alfin polymer, representing a yield of 61.8%. The intrinsic viscosity of the polymer was 6.51. The molecular weight of the polymer was determined and found to be 1,230,000, showing effective molecular weight moderation by the 1,3,6-octatriene as well as demonstrating that molecular weights in proportion to the amount of control agent added can be obtained.

The microstructure of the three polymers of Examples 1 to 3 were determined by infrared analysis, and the following data obtained:

TABLE I

| Example No. | Percent trans | Percent vinyl | Trans/vinyl ratio |
| --- | --- | --- | --- |
| 1 | 63.5 | 25.1 | 2.53 |
| 2 | 63.8 | 27.2 | 2.34 |
| 3 | 64.7 | 27.1 | 2.38 |

EXAMPLES 4 TO 7

There were four polymerization reactions carried out according to the procedure outlined in Examples 1 to 3. Each reaction required 4 ml. of alfin catalyst which was used in each polymerization after cleanup. The catalyst was prepared according to Procedure A above. Microstructures of the alfin polymers were determined by infrared analysis and molecular weights were obtained in advance at 25° C. and calculated using the Staudinger equation. The results obtained are given in Table II.

TABLE II

| Example No. | Moderator | Grams | Percent yield polybutadiene | Intrinsic viscosity | Calc. molecular wt. | Microstructure | | |
| --- | --- | --- | --- | --- | --- | --- | --- | --- |
| | | | | | | Trans | Vinyl | Cis |
| 4 | 1,3,6-octatriene | 1.6 | 61.8 | 6.51 | $1.23 \times 10^6$ | 64.7 | 27.1 | 8.2 |
| 5 | do | 3.2 | 60.7 | 4.65 | $7.24 \times 10^5$ | 63.5 | 25.1 | 11.4 |
| 6 | do | 4.8 | 52.5 | 4.37 | $6.45 \times 10^5$ | 63.8 | 27.2 | 9.0 |
| 7 | 1,3,6-heptatriene | 2.8 | 35.5 | 1.42 | $1.05 \times 10^5$ | 64.5 | 28.5 | 7.0 |

It is evident from the data that both 1,3,6-octatriene and 1,3,6-heptatriene are effective molecular weight control agents with the latter compound being the more highly effective reagent.

EXAMPLES 8 TO 15

A series of polymerizations were carried out following the procedure of Examples 1 to 3, using as the inert solvent for the reaction a branched chain hydrocarbon solvent mixture, Isopar C (see page 10 for the composition), but otherwise following the procedure of Examples 1 to 3. 150 ml. of solvent, 30 g. of butadiene monomer (or monomer mixture, as listed in Table III) and 2 ml. of a 15% solids alfin catalyst prepared according to Procedure A (except making a total volume of 800 ml. instead of 1600 ml.) were used. The molecular weight moderators employed were 1,3,6-heptatriene, 2,6-dimethyl-1,3,6-heptatriene, and 2,4,6-trimethyl-1,3,6-heptatriene.

The data obtained are shown in Table III.

TABLE III

| Example No. | Moderator | Grams | Percent yield | Intrinsic viscosity | Calc. mol. wt. $\times 10^5$ | Microstructure | | Percent comonomer |
| --- | --- | --- | --- | --- | --- | --- | --- | --- |
| | | | | | | Trans | Vinyl | |
| 8 | 1,3,6-heptatriene | 0.5 | 93 | 2.43 | 2.51 | 67.0 | 29.2 | |
| 9 | do | 0.95 | 89 | 1.58 | 1.20 | 66.8 | 29.4 | |
| 10 | do | 1.9 | 87 | 1.14 | 0.72 | 66.8 | 30.3 | |
| 11 | do | 0.5 | 80 | 2.20 | 1.51 | 63.7 | 27.2 | 9 (Isoprene). |
| 12 | do | 0.5 | 89 | 1.94 | 1.74 | 57.0 | 26.1 | 13.3 (Styrene). |
| 13 | 2,6-dimethyl-1,3,6-heptatriene | 2.6 | 96 | 4.33 | 6.17 | 67.1 | 28.4 | |
| 14 | do | 4.9 | 90 | 3.51 | 4.90 | 66.4 | 28.5 | |
| 15 | 2,4,6-trimethyl-1,3,6-heptatriene | 6.8 | 97 | 11.32 | 30.90 | | | |

The results show that the substitution of methyl groups at the 2-, 4- and 6-positions on the triene chain diminish molecular weight control activity somewhat. The 1,3,6-heptatriene is the most active, and the 2,4,6-trimethyl-1,3,6-heptatriene is the least active, in the group of moderators tested. However, the diminished activity merely means that a larger proportion of the molcular weight control agent must be used to produce a given effect. Effective molecular weight control was obtained in all cases, even though the effect was small in the case of 2,4,6 - trimethyl - 1,3,6 - heptatriene, in the amount used. Examples 11 and 12 demonstrate that molecular weight controlled copolymers can be produced by the process of this invention using controlled quantities of these materials. The control of the Mooney viscosity of rubbers for use in commercial applications is of vital importance in processing and can be readily accomplished using this invention.

Having regard to the foregoing disclosure, the following is claimed as the inventive and patentable embodiments thereof:

1. In a process for preparing a polymer from at least one unsaturated organic monomer by polymerization of a reaction mixture containing said monomer and an alfin catalyst, the improvement which comprises carrying out said polymerization in the presence of a molecular weight control agent comprising a triene compound having the general formula:

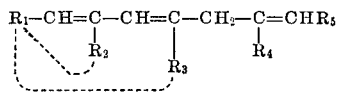

wherein $R_1$, $R_2$, $R_3$, $R_4$ and $R_5$ can be hydrogen or an organic hydrocarbon or oxyhydrocarbon radical having from one to ten carbon atoms, at least one of the R groups being hydrogen.

2. A process in accordance with claim 1 in which the molecular weight of the polymer is controlled solely by adjustment of the proportion of the triene compound while maintaining reaction conditions, proportion of catalyst and other process variables relatively constant.

3. A process in accordance with claim 1 in which the polymerization is effected at a temperature within the range from about 0 to about 100° C.

4. A process in accordance with claim 1 in which the triene compound is the cyclic hydrocarbon, 1-allyl-1,3-cyclohexadiene.

5. A process in accordance with claim 1 in which the triene hydrocarbon compound is an aliphatic 1,3,6-triene.

6. A process in accordance with claim 5 in which the 1,3,6-triene is 1,3,6-octatriene.

7. A process in accordance with claim 5 in which the 1,3,6-triene is 1,3,6-heptatriene.

8. A process in accordance with claim 5 in which the 1,3,6-triene is 2,6-dimethyl-1,3,6-heptatriene.

9. A process in accordance with claim 5 in which the 1,3,6-triene is a methyl-substituted-1,3,6-triene.

10. A process in accordance with claim 1 in which the monomer is 1,3-butadiene.

11. A process in accordance with claim 1 in which the monomer is 1,3-butadiene and isoprene.

12. A process in accordance with claim 1 in which the monomer is 1,3-butadiene and styrene is a comonomer.

13. A process in accordance with claim 1 in which the reaction mixture is quenched by plunging it into water, and then steam-distilling volatile materials, removing NaCl and caustic in the aqueous phase.

14. A process in accordance with claim 1 in which the triene hydrocarbon is in an amount within the range from about 0.1 to about 10 weight percent based on the weight of monomer used.

15. A process in accordance with claim 1 in which the amounts of monomer and triene hydrocarbon compound are calculated to give an alfin polymer concentration in the reaction solution within the range from about 2 to about 15 weight percent alfin rubber solids at the required alfin catalyst concentration.

16. A process in accordance with claim 1 in which the reaction is carried out continuously, by continuously blending the reactants, continuously passing the blend through a reaction zone while effecting the polymerization, continuously withdrawing alfin polymer containing reaction cement mixture from the reaction zone, continuously quenching the reaction mixture, continuously separating volatile materials from the reaction mixture, recycling them while continuously recovering alfin polymer.

17. A continuous process in accordance with claim 16 in which the quenching is effected by plunging the reaction mixture into water and steam distilling volatile materials from the resulting dispersion using a suitable dispersing aid to form discrete particles of alfin polymer crumb.

References Cited

UNITED STATES PATENTS

| | | | |
|---|---|---|---|
| 3,005,811 | 10/1961 | Youngman | 260—94.3 |
| 3,067,187 | 12/1962 | Greenberg et al. | 260—84.2 |
| 3,068,217 | 12/1962 | Higgins et al. | 260—94.3 |
| 3,220,999 | 11/1965 | Duck et al. | 260—94.3 |
| 3,535,296 | 10/1970 | Broering | 260—82.1 |
| 3,518,238 | 6/1970 | Onishi et al. | 260—82.1 |

JAMES A. SEIDLECK, Primary Examiner

R. A. GAITHER, Assistant Examiner

U.S. Cl. X.R.

260—80.7, 83.7, 93.5 S